July 10, 1962  A. J. SARKA  3,043,177
SHEAR AND FEED MEANS FOR CONTINUOUSLY ADVANCING STRIP
Filed July 28, 1958
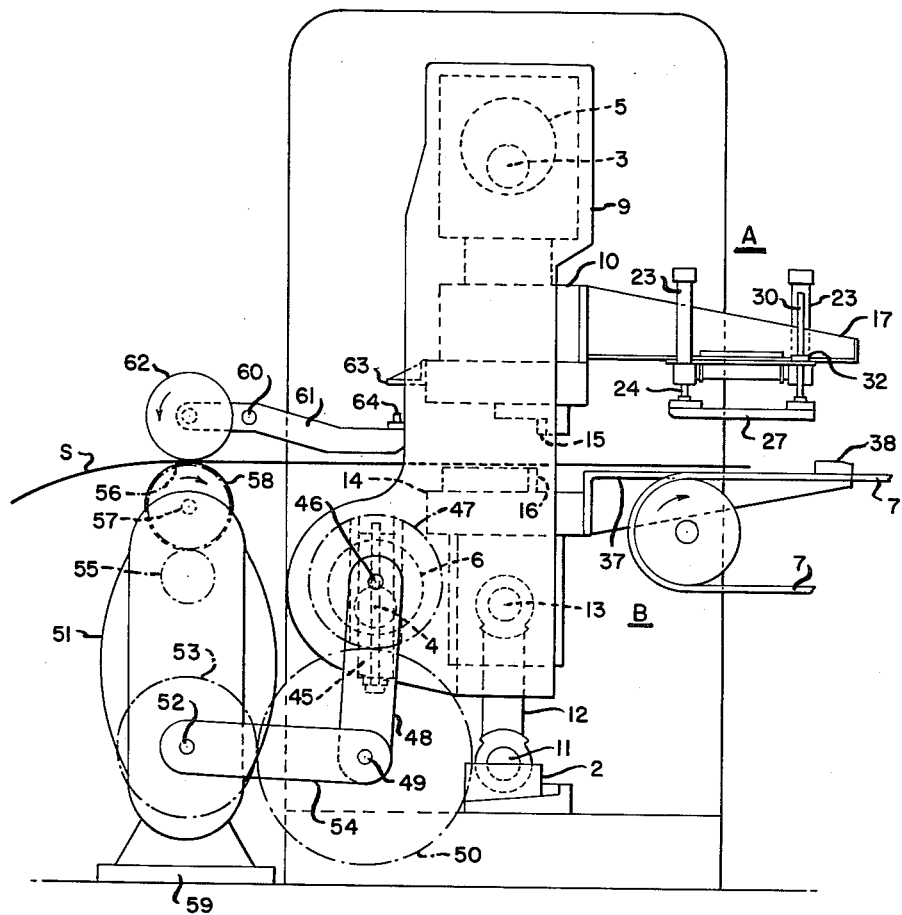
INVENTOR
Albert J. Sarka

United States Patent Office 3,043,177
Patented July 10, 1962

3,043,177
SHEAR AND FEED MEANS FOR CONTINUOUSLY ADVANCING STRIP
Albert J. Sarka, Maple Heights, Ohio, assignor, by mesne assignments, to The Wean Engineering Company, Inc.
Filed July 28, 1958, Ser. No. 751,433
1 Claim. (Cl. 83—312)

This invention relates to shearing continuously advancing strip and is an improvement in the methods and apparatus of my copending applications Serial Nos. 571,418, filed March 14, 1956 now Patent No. 2,857,966, 617,180, filed October 19, 1956 and 732,504, filed May 2, 1958 and now abandoned.

In use of the apparatus for shearing continuously advancing strip disclosed in my said copending applications and in practice of the methods employed in accordance therewith the feed length of the strip, i.e., the length of pieces of strip which could be sheared off, was limited by the stroke of the shear. While it was possible to adjust the feed length to some extent for a shear of given stroke, if it were attempted to greatly increase the feed length that would have to be done by increasing the speed of the feed rolls with the result that there would be formed in the strip upon each shearing cycle a hump of such size that it could not be flattened out in the succeeding cycle. Stated simply, prior to the present invention there has been a definite limitation in feed length in relation to press or shear stroke and when it has been desired to shear relatively long lengths of strip it has been necessary to employ a shear or press of relatively great stroke. But the increase in stroke means a larger, heavier, more expensive machine.

I have devised a way of shearing longer lengths of strip on a shear of given stroke than could be sheared previously. I provide a variable speed drive for the means for feeding the strip so that during each cycle intermediate instants of shearing the strip is speeded up and then slowed down. The minimum strip speed corresponds with the speed of advance of the shearing means parallel to the direction of advance of the strip at the instant of shearing, and as soon as one length of strip has been sheared off the feed of the strip behind that length is accelerated so that a relatively great length of the strip is advanced ready to be sheared off in the succeeding cycle. Then just before the instant of shearing in the succeeding cycle the strip is decelerated to the speed of advance to the shearing means. Thus I greatly increase the utility and efficiency of shearing mechanisms which heretofore because of their limited stroke have been deemed suitable for shearing only relatively short lengths.

I provide a method of shearing continuously advancing strip comprising cyclically advancing generally along the path of the strip a shear including continuously cyclically operating shearing means having shearing blades at opposite faces of the strip and controlling the speed of advance of the strip so that at the instant of shearing in each cycle the strip is advancing at the speed of advance of the shear and intermediate the instants of shearing the strip is speeded up and then slowed down. Preferably at the instant of shearing in each cycle the advance of the strip is controlled by the shearing means so that the strip is advancing at the speed of advance of the shear, and the strip is speeded up and then slowed down intermediate the instants of shearing. Desirably I normally feed the strip to and through the shear by feeding means at the entrance end of the shear, at the instant of shearing in each cycle I render the feeding means inoperative and control the advance of the strip by the shearing means so that the strip is advancing at the speed of advance of the shear and intermediate the instants of shearing I speed up and then slow down the feeding means.

I provide apparatus for shearing continuously advancing strip comprising a cyclically operable shear which advances while it shears, the shear including continuously cyclically operating shearing means having shearing blades at opposite faces of the strip, and means controlling the speed of advance of the strip so that at the instant of shearing in each cycle the strip is advancing at the speed of advance of the shear and intermediate the instants of shearing the strip is speeded up and then slowed down. I preferably provide feeding means for feeding strip to the shear, a source of motive power and connections from the source of motive power to the shear and feeding means whereby both the shear and the feeding means are driven from the same source of motive power, the connections comprising means operable between the source of motive power and the feeding means without affecting the operation of the shear for causing advance of the shear just prior to the instant of shearing in each cycle at a speed approximating the speed of advance of the strip and speeding up and then slowing down the strip intermediate the instants of shearing. I preferably dispose a variable speed transmission between the source of motive power and the feeding means for causing advance of the shear just prior to the instant of shearing in each cycle at a speed approximating the speed of advance of the strip and speeding up and then slowing down the strip intermediate the instants of shearing. I also preferably provide means for altering the operation of the variable speed transmission to vary at will the length of strip fed intermediate the instants of shearing.

In a preferred apparatus I drive by the shear the means controlling the speed of advance of the strip. Such means preferably comprises a variable speed transmission including an eccentric drive the eccentricity of which may be varied whereby the length of strip fed intermediate the instants of shearing may be varied at will.

Preferably the means driven by the shear control the speed of advance of the strip so that just prior to the instant of shearing in each cycle the strip is advancing at a speed approximating the speed of advance of the shear and intermediate the instants of shearing the strip is speeded up and then slowed down, the shearing means have means for controlling the advance at the instant of shearing so that at that instant the strip is advanced at the same speed at the shearing means and the first mentioned means are rendered inoperative while the shearing means are controlling the strip.

Other details, objects and advantages of the invention will become apparent as the following description of a present preferred embodiment thereof and a present preferred method of practicing the same proceeds.

In the accompanying drawing I have shown a present preferred embodiment of the invention and have illustrated a present preferred method of practicing the same, the FIGURE being a diagrammatic side elevational view of apparatus for shearing continuously advancing strip.

The general type of apparatus for shearing continuously advancing strip which I have invented and which is the subject of my above mentioned copending applications and other applications as well as issued patent is now well known to those skilled in the art and it is unnecessary to describe in detail all of the parts of the apparatus. Consequently the drawing consists of but a single diagrammatic FIGURE which sufficiently illustrates the invention herein claimed.

Referring now more particularly to the drawing, upper and lower shafts indicated respectively at 3 and 4 rotate in the same direction (counterclockwise viewing the drawing) at the same speed and respectively carry corresponding eccentrics 5 and 6. The shafts 3 and 4 are driven through suitable driving connections by any suitable source of power. Carried by the eccentrics 5 and 6 for rotary movement in the counterclockwise direction viewing the drawing is a frame 9 which carries the upper head 10 of the shear.

Journaled in a base member 2 at 11 are a pair of parallel arms 12 pivotally connected at 13 to the lower head 14. The lower head 14 is guided for up and down movement in the frame 9. Thus as the frame 9 carrying the upper head 10 partakes of its rotary or cyclical movement the lower head 14 oscillates back and forth about axis 11. The upper shear 15 is carried by the upper head 10 and lower shear blade 16 is carried by the lower head 14. I shall use the term "upper shearing element" to include the upper head 10, the upper shear blade 15 and the mechanism carried by and movable with the upper head which will presently be described. I shall use the term "lower shearing element" to include the lower head 14, the lower shearing blade 16 and the mechanism carried by and movable with the lower head which will presently be described. The characteristic relative movements of the upper and lower shearing elements are explained in my said copending applications and in my Patent No. 2,827,962 and in any event are now well known to those skilled in the art. The upper and lower shearing elements move toward the right viewing the drawing as they approach each other and the upper and lower shear blades 15 and 16 shear or sever the strip when they are closest together. At the instant of shearing the strip is controlled by the shearing elements. As the shearing elements continue to move toward the right immediately following the instant of shearing they are retracted away from each other and the sheared off portion of the strip is released and may be carried forward, preferably at somewhat increased speed, by any suitable conveying means as now known to those skilled in the art. I have shown a conveyor 7 for that purpose, the active reach of the conveyor 7 being the upper reach which moves toward the right viewing the drawing, and I preferably operate the conveyor at a speed somewhat greater than the greatest speed at which the material moves toward the right viewing the drawing so that each sheared off length of material will be quickly conveyed toward the right and out of the way of the succeeding shearing operation.

Carried by and extending forwardly from the upper head 10 and constituting a portion of the upper shearing element is a supporting arm 17. The upper shearing element including the upper head 10, the upper shear blade 15, the supporting arm 17 and the means carried thereby presently to be described is designated as a whole by A. The lower shearing element including the lower head 14, the lower shear blade 16 and the means carried by the lower head presently to be described is designated as a whole by B.

The arm 17 carries upright cylinders 23 in which operate pistons from which extend piston rods 24 carrying an upper clamping member 27. Gas under pressure above the pistons in the cylinders 23 urges the clamping member 27 downwardly. Downward movement of the clamping member is limited by adjustably positionable stop collars 32 carried by rods 30. The structure, mounting and operation of the clamping member 27 are shown and described in detail in my copending application Serial No. 732,504 and such detailed structure does not constitute the present invention so the specific description contained in said application is not here repeated.

The lower head 14 carries an arm 37 which extends forwardly parallel to the pass line and generally beneath the arm 17. Mounted atop the arm 37 is the front stop 38. The front stop 38 is positioned in the center line of the shear immediately ahead (toward the right viewing the drawing) of the clamping member 27 which is carried by the upper shearing element A as above described.

Carried by the shaft 4 is a transverse mounting member or slide 45 serving as a mounting bracket for a stub shaft 46 to which is fixed a gear 47. This structure may be as shown in my Patent No. 2,838,947. The stub shaft 46 is adapted to be adjustably positioned along the slide 45 and in each adjusted position therealong to be fastened in place to the slide so that as the shaft 4 carrying the slide 45 rotates the stub shaft 46 and gear 47 rotate with it. It will be seen that if the stub shaft 46 is positioned coaxially with the shaft 4 the gear 47 will partake of precisely the rotary motion of the shaft 4 which is substantially constant speed turning in the counterclockwise direction viewing the drawing. When however, the stub shaft 46 carrying the gear 47 is moved along the slide 45 so that the axis of the stub shaft 46 and gear 47 is offset from the axis of the shaft 4 as shown in the drawing rotation of the shaft 4 will cause movement of the stub shaft 46 in a circular path about the axis of the shaft 4 and since the stub shaft 46 is fixed to the slide 45 and the gear 47 is fixed to the stub shaft 46 the gear 47 will likewise partake of the orbital movement of the stub shaft 46 about the axis of the shaft 4 and also will turn since the stub shaft turns as it moves in its orbit.

Straps 48 are pivoted to the stub shaft 46 and extend generally downwardly therefrom and carry at their lower ends a stub shaft 49 on which is mounted for rotation a gear 50 which is always in mesh with the gear 47 regardless of the position of the stub shaft 46 along the slide 45. I provide a variable speed transmission such as a PIV 51 mounted on a base 59 and having an input shaft 52 to which is fixed a gear 53. The gear 53 is maintained in mesh with the gear 50 at all times by straps 54 extending between the shafts 52 and 49. The gear 53 is of the same diameter as the gear 47. The gear 53 through the transmission 51 drives a gear 55 which meshes with a gear 56 fixed to a shaft 57 journaled for rotation in fixed bearings and to which is also fixed a feed roll 58. The feed roll 58 is mounted in fixed position and constitutes the driving feed roll of a cooperative pair of rolls for feeding strip S to the shear. When the stub shaft 46 is positioned coaxially with the shaft 4 the feed roll 58 rotates at constant speed. When, however, the axis of the stub shaft 46 is offset from the axis of the shaft 4 as shown in the drawing the feed roll 58 is driven at alternately accelerating and decelerating speed, the feed roll partaking of a cycle of acceleration and deceleration for each rotation of the shaft 4, i.e., for each shearing cycle of the shear.

Pivoted to the frame or supporting structure of the shear at 60 are arms 61 rotatably carrying at their left hand extremities viewing the drawing a feed roll 62 adapted to cooperate with the driven feed roll 58 by pressing the strip S down thereagainst so that the strip will be fed forward. Spring means not shown are utilized for normally pressing the feed roll 62 down toward the feed roll 58. The feed roll 62 is an idler roll whose function is simply to maintain the strip in driven relationship to the driven feed roll 58.

The head 10 carries a detent 63 adapted when the head moves downwardly in a shearing cycle to engage adjustable contact members 64 mounted respectively on the arms 61 resulting in tilting of the arms 61 in the clockwise direction about the axis of the shaft 60 and raising of the upper feed roll 62 and consequently rendering the feed rolls inoperative to feed the strip immediately prior to the instant of shearing. Substantially coincidently with the rendering inoperative of the feed rolls the upper clamping member 27 clamps the forward end of the strip immediately to the left of the lower front stop 38 to the arm 37, the forward end of the strip having advanced to and being in contact with the left hand face of the front stop 38.

I shall describe a cycle of operation of the apparatus. As the upper shearing element A and the lower shearing element B move toward the right viewing the drawing they approach each other. Simultaneously the leading end of the strip is advanced by the feed rolls 58 and 62 and registers against the front stop 38, i.e., against the left-hand vertical face of the front stop as viewed in the drawing. As the upper and lower shearing elements A and B approach each other the clamping member 27 engages the upper face of the strip and clamps the strip to the arm 37 while the leading end of the strip is registered to the front stop 38. The clamping member 27 clamps the strip just before the instant of shearing; and just as the strip is clamped the detent 63 tilts the arms 60 rendering the feeding means inoperative so that at the instant of shearing the strip is controlled by the shearing means. After the strip is clamped the shearing elements A and B continue to move toward each other accompanied by compression of the gas in the upper portions of the cylinders 23 and movement of the stop collars up away from the plate or flange 20. Following the instant of shearing the upper and lower shearing elements A and B continue to move toward the right and move away from each other. When the plate or flange 20 engages the stop collars 32 the clamping member 27 moves along with the arm 17 and the sheared off portion of the strip is released and is advanced by the conveyor 7.

The mechanism including the gears 47, 50 and 53, the transmission 51 and the gears 55 and 56 and the feed rolls 58 is designed and adjusted so that the minimum speed of advance or feed of the strip occurs just prior to the instant of shearing, the strip at that time being fed forward at a speed substantially equal to the forward speed of the shear. Immediately following the instant of shearing when the feed rolls again become operative to feed the strip forward the feed rolls are accelerated so that in the initial portion of the cycle the strip is advanced at relatively high speed, and prior to the succeeding instant of shearing the feed rolls are decelerated to reduce the speed of advance of the strip to a speed substantially equal to the speed of advance of the shear along the pass line. Thus relatively great lengths of strip can be sheared without increasing the stroke of the shear as has heretofore been necessary. The greater the eccentricity between the stub shaft 46 and the shaft 4 the greater will be the length of strip fed upon each shearing cycle. The front stop 38 is adjusted conformably along the arm 37. The means for adjustably positioning the front stop along the arm are shown in my said copending application Serial No. 732, 504 but are not shown herein since such means do not constitute the present invention.

By the invention above described I am able to greatly increase the range of usefulness of a shear of a particular stroke and with such a shear to shear continuously at high speed greater lengths of strip than it has been possible to shear prior to my invention.

While I have shown and described a present preferred embodiment of the invention and have illustrated a present preferred method of practicing the same it is to be distinctly understood that the invention is not limited thereto but may be otherwise variously embodied and practiced within the scope of the following claim.

I claim:

A shear for shearing continuously advancing strip comprising upper and lower members each having a shearing blade, the shearing blades being located at opposite faces of the strip, the upper and lower members being continuously cyclically operable relatively to each other to shear the strip and so that each of the shearing blades advances during shearing, feed means governed by the shear for controlling the speed of advance of the strip so that just prior to the instant of shearing in each cycle the strip is advancing at a speed approximating the speed of advance of the shear blades and intermediate the instants of shearing the strip is speeded up and then slowed down, each of the upper and lower members carrying a clamping member, the clamping members cooperating to form clamping means for controlling the advance of the strip at the instant of shearing so that at that instant the strip is advanced at the same speed as the shearing blades, and means rendering inoperative the feed means while the clamping means are controlling the strip.

References Cited in the file of this patent
UNITED STATES PATENTS

| | | |
|---|---|---|
| 1,392,597 | Ricardo | Oct. 4, 1921 |
| 2,062,136 | Morresford | Nov. 24, 1936 |
| 2,289,394 | Ungar | July 14, 1942 |
| 2,359,403 | Burt | Oct. 3, 1944 |
| 2,827,962 | Sarka | Mar. 25, 1958 |
| 2,838,947 | Sarka | June 17, 1958 |